United States Patent [19]

Baker et al.

[11] Patent Number: 5,953,006
[45] Date of Patent: Sep. 14, 1999

[54] METHODS AND APPARATUS FOR DETECTING AND DISPLAYING SIMILARITIES IN LARGE DATA SETS

[75] Inventors: Brenda Sue Baker, Berkeley Heights; Kenneth Ward Church, Chatham; Jonathan Isaac Helfman, Gillette; Brian W. Kernighan, Berkeley Heights, all of N.J.

[73] Assignee: Lucent Technologies Inc., Murray Hill, N.J.

[21] Appl. No.: 07/853,459

[22] Filed: Mar. 18, 1992

[51] Int. Cl.[6] ...................................................... G06F 15/00
[52] U.S. Cl. ............................................. 345/326; 345/341
[58] Field of Search ..................................... 395/144, 145, 395/146, 147, 161; 345/326, 340, 341

[56] References Cited

PUBLICATIONS

Pustell et al., "A high speed, high capacity homology matrix: zooming through SV40 and polyoma", Nucleic acid Research, vol. 10, No. 15, 1982, pp. 4765–4782.

Aho et al., "Compilers Principles, Techniques and Tools", Addison–Wesley Publishing Company, Reading, MA 1986, pp. 83–88.

"Truchet–Tile Characterization Of Randomness," *IBM Technical Disclosure Bulletin,* vol. 32, No. 8B, Jan. 1, 1990, pp. 196–198.

Eick, Stephen G., "Dynamic Graphics for Software Visualization", Interface '92 Conf. Proc., College Station, Texas (1992).

Maizel, Jr., Jacob N. and Lenk, Robert P., "Enhanced graphic matrix analysis of nucleic acid and protein sequences", Proc. Nat'l. Acad. Sci. USA, vol. 78, No. 12, pp. 7665–7669, Dec. 1991: Genetics.

Pustell, James and Kafatos, Fotis C., "A high speed, high capacity homology matrix: zooming through SV40 and polyoma", Nucleic Acids Research, vol. 10, No. 15, 1982.

Chambers, J. M., "Algorithm 410 Partial Sorting [M1]", Comm. of the ACM, May 1971, vol. 14, No. 5.

Salton, G., "Automatic Text Processing", Addison–Wesley Publishing Co., (1989), pp. 238–240, 284–289.

McCreight, Edward M., "A Space–Economical Suffix Tree Construction Algorithm", J. of the Assoc. for Computing Machinery, vol. 23, No. 2, Apr. 1976, pp. 262–272.

Aho, Alfred V., Sethi, Ravi, and Ullman, Jeffrey D., "Compilers Principles, Techniques, and Tools", Addison–Wesley Publishing Company, Reading, MA (1986), pp. 83–88.

*Primary Examiner*—Ba Huynh
*Attorney, Agent, or Firm*—Gordon E. Nelson; Donald P. Dinella

[57] ABSTRACT

Interactive Methods and apparatus for studying similarities of values in very large data sets. The methods and apparatus employ a dotplot in an interactive graphical user interface to make the relationship between the similarities and the data set visible. A variety of filtering, weighting, and compression techniques make it possible to employ the dot plot with sequences of more than 10,000 tokens and to interactively magnify the dot plot, change weighting and display quantization, and view the underlying data. Also disclosed is a technique which is employed in the apparatus for identifying long sequences of similar tokens. The apparatus is used in the study of large bodies of text and code.

15 Claims, 13 Drawing Sheets

FIG. 6

```
copy_number(&pmin, &pmax,             copy_number(&pmin, &pmax,
    pfi->min_bounds.lbearing,             pfh->min_bounds.left,
    pfi->max_bounds.lbearing);            pfh->max_bounds.left);
*pmin++ = *pmax++ = ',';              *pmin++ = *pmax++ = ',';
copy_number(&pmin, &pmax,             copy_number(&pmin, &pmax,
    pfi->min_bounds.rbearing,             pfh->min_bounds.right,
    pfi->max_bounds.rbearing);            pfh->max_bounds.right);
*pmin++ = *pmax++ = ',';              *pmin++ = *pmax++ = ',';
copy_number(&pmin, &pmax,             copy_number(&pmin, &pmax,
    pfi->min_bounds.width,                pfh->min_bounds.width,
    pfi->max_bounds.width);               pfh->max_bounds.width);
*pmin++ = *pmax++ = ',';              *pmin++ = *pmax++ = ',';
copy_number(&pmin, &pmax,             copy_number(&pmin, &pmax,
    pfi->min_bounds.ascent,               pfh->min_bounds.ascent,
    pfi->max_bounds.ascent);              pfh->max_bounds.ascent);
*pmin++ = *pmax++ = ',';              *pmin++ = *pmax++ = ',';
copy_number(&pmin, &pmax,             copy_number(&pmin, &pmax,
    pfi->min_bounds.descent,              pfh->min_bounds.descent,
    pfi->max_bounds.descent);             pfh->max_bounds.descent);
```
603        601        605

FIG. 7

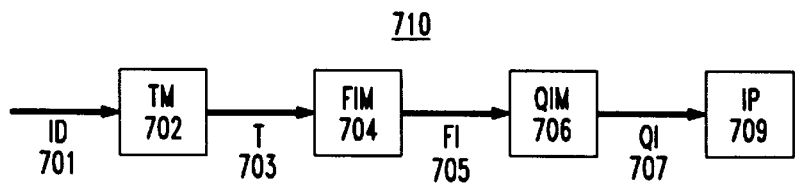

FIG. 8

```
/* let fimage be an N by N floating point array */
float fimage[N][N];
                                                                801
for(i=0; i<N; i++)    803
    for(j=0; j<N; j++)
        if(tokens[i] == tokens[j])    /* is the i-th token the same as the j-th? */
            fimage[i][j] = 1;         /* yes, insert a dot */
        else fimage[i][j] = 0;        /* no, leave it clear */
```

FIG. 9

```
                                              901
for(i=0; i<N; i++)
  for(j=0; j<N; j++)
    if(tokens[i] == tokens[j])
      fimage[i][j] = weight(token[i]);
    else fimage[i][j] = 0;
```

FIG. 10

```
/* Initialize freq */
float freq[V] = {0};                     1001
for(i=0; i<N; i++)
  freq[tokens[i]]++;

for(i=0; i<N; i++)
  for(j=0; j<N; j++)
    if(tokens[i] == tokens[j])
      fimage[i][j] = 1/(freq[token[i]]);
    else fimage[i][j] = 0;
```

FIG. 11

```
/* Initialize fimage */                  1101
float fimage[n][n] = {0};

/* Map x from token coordinates into fimage coordinates */
#define CELL(x) (((x) * n) / N)

for(i=0; i<N; i++)
  for(j=0; j<N; j++)
    if(tokens[i] == tokens[j])
      fimage[CELL(i)][CELL(j)] += weight(([token[i]]);
```

FIG. 12

```
for(type=0; type<V; type++) {
   w = weight(type);                          1201
   f = freq[type];
   postings = get_postings(type);
   for(p1=0; p1 < f; p1++) {
      i = postings[p1];
      for(p2=0; p2 < f; p2++) {
         j = postings[p2];
         fimage[CELL(i)][CELL(j)] += w;
      }
   }
}
```

FIG. 13

```
for(type=0; type<V; type++) {
  w = weight(type);
  f = freq[type];
  if(f < T) {                     /* the key approximation */
    postings = get_postings(type);
    for(p1=0; p1 < f; p1++) {
      i = postings[p1];
      for(p2=0; p2 < f; p2++) {        1301
      j = postings[p2];
      fimage[CELL(i)][CELL(j)] += w;
      }
    }
  }
}
```

FIG. 14

```
/* Initialize qimage */
char qimage[n][n] = {0};              1401 for(i=0; i<n; i++)
   for(j=0; j<n; j++)
      qimage[i][j] = quantize(fimage[i][j]);
```

```
/* make a copy of the fimage */
float copy[n*n];
memcpy(copy, fimage, sizeof(fimage));

int
fcompar(a, b)
     float *a, *b;
{                                           1501
  if(*a < *b) return(-1);
  if(*a == *b) return(0);
  return(1);
}

/* sort the copy */
qsort(copy, n*n, sizeof(float), fcompar);

float breaks[C+1];
for(i = 0; i<=C; i++)
     breaks[i] = copy[n*n*i/C];

int
quantize(x)
     float x;
{
  for(i=0; i<C; i++)
    if(breaks[i] <= x && breaks[i+1] > x)
       return(i);
}
```

FIG. 18

```
clist
process(node n) {
    clist cl;
    if (n is a leaf) return prec(n):position(n);
    cl = NULL;
    for each son s of n
        cl = combine(cl,process(s),length(n));
    return cl;
}
```
1801

```
clist
combine(clist cl1, clist cl2, int len) {
  token_type C1, C2;
  for each C1 in an element of cl1
    for each C2 in an element of cl2
        if ((C1 != C2) and len >= minprint) {
            for every $p sub i$ in the plist for C1
                for every $p sub j$ in the plist for C2
                    report a longest match of length $len$ at $p sub 1$ and $p sub 2$
    construct a clist as follows:
    for each token type C occurring in at least one of c1 and c2
        include C:union of the plists for C in c1 and c2
    return the resulting clist;
}
```

FIG. 19

| x=y+z         | x=a+b;        |
|---------------|---------------|
| if(y>z)       | if(b>c)       |
|    print("yes"); |    print("no"); |
| h=f(x);       | h=f(x);       |
| y=x;          | c=x;          |

| Line | Seq1 | Seq2 | Rewrite Rules |
|------|------|------|---------------|
| 1 | x=y+z | x=a+b; | x → x; y → a; z → b |
| 2 | if(y>z) | if(b>c) | y → b; z → c |
| 3 | print("yes"); | print("no"); | "yes" → "no" |
| 4 | h=f(x); | h=f(x); | h → h; x → x |
| 5 | y=x; | c=x; | y → y; x → x |

FIG. 21

```
#define id(i,j) allsyms[ begsym[i]+j]; /*jth symbol of i'th token*/
#define NOTSET        -1

/*
check parameters for the exact match of tokens s0 to s0+same-1, s1 to s1+same-1
*/
findproc(int s0,int s1, int same)
{       int i,j,p0,p1,newstart;
        boolean conflict;
        int parno = 0;    /*number of params assigned so far*/
        int offset = 0;   /*current copies start at s0+offset, s1+offset*/
        initialize all values in sym,lastuse, and par to NOTSET;
        for (i=0; i<same; ++i) {
                conflict=false;
                newstart = offset;

/*check to see if any param pairs conflict with previous uses. */
                for (j=0; j< number of symbols for token s0+i; ++j) {
                        p0=par[0,id(s0+i,j)]; p1 = par[1,id(s1+i,j)];
                        if(p0 != p1) {
                                conflict = true;
                                newstart = max(newstart,lastconflict(p0,p1)+1);
                        }
                }
                if (conflict) {
                        check_proc(s0+offset,s1+offset,i-offset,parno,offset);
                        offset = newstart;
                        parno  = cleanup(offset,parno,par0,par1);
                }
                /*now all param pairs should be the same, possibly NOTSET*/
                for (j=0; j< number of symbols for token s0+i; ++j) {
                        if (par[0,id(s0+i,j)] == NOTSET) {
                                /*set a new parameter */
                                sym[0,parno] = id(s0+i,j,);
                                sym[1,parno] = id(s1+i,j);
                                par[0,id(s0+i,j)] = parno;
                                par[1,id(s1+i,j)] = parno;
                                parno = parno + 1;
                        }
                        lastuse[par[0,id(s0+i,j)]]=i;
                }
        }
        check_proc(s0+offset,s1+offset,same-offset,parno,offset);
}
```

```
check_proc(int s0,int s1,int same,int parno,int offset)
{       /* is this match reportable? */
        /* if too few tokens or too many parameters, then no */
        if ((same < minprint) or parno >same/2) return;
        report a match of s0 to s0+same-1 and s1 to s1+same-1,
                including the parameters that are not identical and
                that occur within the match as determined by
                whether the lastuse values are >= offset.
} int                                                     2201
cleanup(int offset,int parno)
{
        int i,new;
        for (i=0,new=0; i<parno; ++i)
                if (lastuse[i] >=offset) {
                        /*compact sym and correct lastuse, par*/
                        sym[0,new] = sym[0,i];  sym[1,new] = sym[1,i];
                        lastuse[new] = lastuse[i];
                        par[0,sym[0,i]] = new;  par[1,sym[1,i]] = new;
                        new = new + 1;
                }
                else {  /*param no longer needed*/
                        par[0,sym[0,i]] = NOTSET;
                        par[1,sym[1,i]] = NOTSET;
                }
        return(new);
} int
lastconflict(int p0, int p1)  /*last token with conflicting parameter use*/
{
        int use0, use1;
        if (p0 == NOTSET)
                return lastuse[p1];
        else if (p1 == NOTSET)
                return lastuse[p0];
        else return max(lastuse[p0],lastuse[p1]);
}
```

METHODS AND APPARATUS FOR DETECTING AND DISPLAYING SIMILARITIES IN LARGE DATA SETS

Background of the Invention

1. Field of the Invention

The invention is addressed to apparatus and methods for interactively studying very large bodies of data in general and more specifically to apparatus and methods for studying similarities of values in such very large bodies of data.

2. Description of the Prior Art

Computers have made it relatively easy to collect, store, and access large collections of data; however the view of the data which has been provided by the computer has typically been the 50 or 100 lines which can be shown in a display terminal. The most modern graphical interface technology has made possible the display of information for up to about 50,000 lines of code in a display, as set forth in U.S. Pat. Application 07/802,912, S. G. Eick, *Information Display Apparatus and Methods*, filed Dec. 6, 1991 and assigned to the assignee of the present patent application. While the techniques of Eick are a great improvement over the display of 50 or 100 lines, they still cannot deal with bodies of data which consist of millions of entities such as records or lines. Further, the techniques of Eick do not address a frequent problem in dealing with such large bodies of data: namely, being able to visualize the relationship between similar or duplicate information and the body of data as a whole.

This kind of visualization is important in areas as diverse as the study of DNA, the automated manipulation of bodies of text, the detection of copyright infringement, and the maintenance of large bodies of code for computer systems. A technique which has been used in DNA research for such visualization is the dot plot, as explained in Maizel, J. and Lenk, R., "Enhanced graphic matrix analysis of nucleic acid and protein sequences," *Proc. Natl. Acad. Sci. USA*, 78:12, 7665–7669. As employed in DNA research, the dot plot is used to compare a sequence of n nucleotides with itself. A representation of an n×n matrix is created in a computer system. Each element (i,j) of the matrix represents a comparison between nucleotide (i) of the sequence and nucleotide (j) of the sequence; if they are the same, a mark is placed in the matrix element. The dot plot is then output to a printer or plotter. The patterns of marks in the dot plot provide an overview of the similarities in the sequence of DNA. In order to make significant patterns more visible, the dot plot is filtered; various compression techniques further make it possible to display a dot plot for a sequence of up to 10,000 nucleotides on a single piece of paper.

Although dot plots have been used in DNA research for over 10 years to display the results of comparisons between sequences of DNA, their use has not spread to other areas where similarities need to be studied. Problems with applying such techniques in these other areas include the much greater complexity of the data being compared, the need to deal with much larger sets of data, the need to make the techniques speedy enough so that they can be used interactively, and the need to develop a user interface which permits the user of the dot plot to interact easily with the data which underlies the dot plot and also permits the user to easily control the filtering used in the dot plot. It is an object of the present invention to overcome the above problems with dot plots and thereby to make them available for use in any area in which similarities in large bodies of data are of interest.

SUMMARY OF INVENTION

In one aspect, the invention is apparatus for displaying similarities between tokens in a sequence of n tokens, where n is much larger than 10,000, the apparatus including:

means for representing an n×n matrix wherein a first mark is placed in element (i,j) of the matrix if a comparison of token (i) with token (j) indicates that token (i) and token (j) are similar; and means for mapping the n×n matrix onto a display matrix, the display matrix being small enough to fit in its entirety on a display device and the mapping being done such that second marks indicating significant first marks are displayed in the display matrix.

In another aspect, the invention is apparatus for displaying similarities between lines of text in a sequence of n lines of text, the apparatus including means for representing a n×n matrix wherein there is a first mark in element (i,j) of the matrix if a comparison of line (i) with line (j) indicates that the values of line (i) and line (j) are similar; and means for mapping the n×n matrix onto a display matrix, the mapping being done such that second marks indicating significant first marks are displayed in the display matrix.

In yet another aspect, the invention is apparatus for displaying values of an attribute of records in a sequence of n records, the apparatus including matrix display means which displays a representation of an n×n matrix wherein each element (i,j) of the matrix represents record (i) and record (j);

pointing means for selecting one element in the representation; and attribute display means for responding when the pointing means designates the element for record (i) and record (j) by displaying the values of the attribute for a first set of records including record (i) and a second set of records including record (j).

The foregoing and other aspects, objects, and advantages of the invention will be apparent to one of ordinary skill in the art who peruses the following Drawing and Detailed Description, wherein:

BRIEF DESCRIPTION OF THE DRAWING

FIG. 6 is a block diagram of a preferred embodiment of a system which uses dot plots;

FIG. 7 is an algorithm for computing a floating point representation of a dot plot;

FIG. 8 is an algorithm for giving the tokens being compared weights;

FIG. 9 is an algorithm for determining what the weights of the tokens should be;

FIG. 10 is an algorithm for compressing the floating point representation;

FIG. 11 is an algorithm used to approximate the comparisons between the tokens;

FIG. 12 is an additional algorithm used to approximate the comparisons between the teens;

FIG. 13 is an algorithm for producing a quantized representation from the floating pent representation;

FIG. 14 is an algorithm for quantizing the values of elements of the floating point representation;

FIG. 18 is an algorithm employed in the apparatus of FIG. 16;

FIG. 19 shows an irreconcilable parameter conflict;

FIG. 20 shows another example of parameter conflict;

FIG. 21 shows a first part of an algorithm for parameter analysis; and

FIG. 22 shows a second part of an algorithm for parameter analysis.

Figure 1:
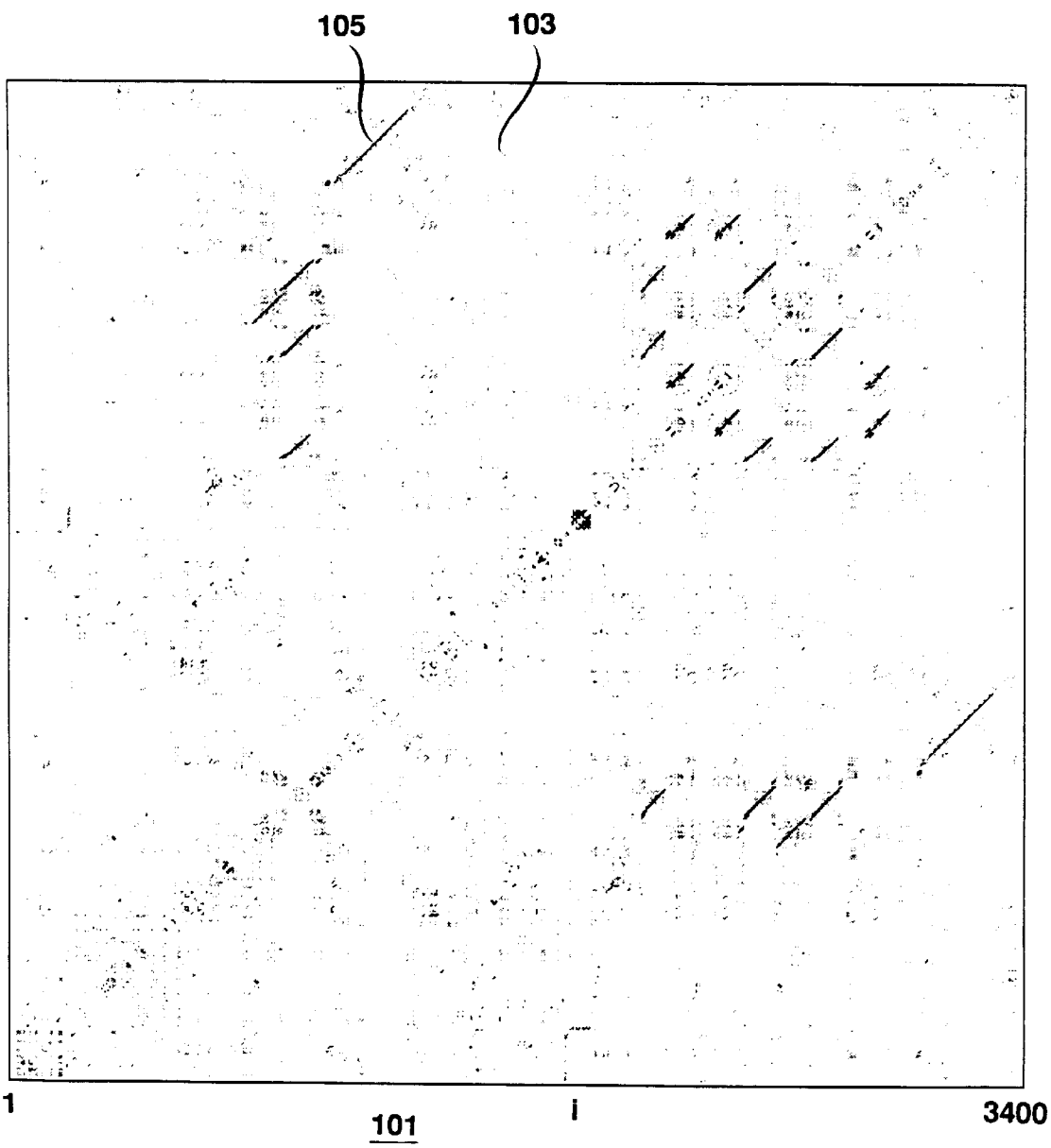
FIG. 1 is a display matrix of a dot plot showing similarities in a body of C code.

The reference numbers employed in the Drawing and the Detailed Description have three or more digits. The two least significant digits are a number within a figure; the remaining digits are the figure number. Thus, the element with the reference number "305" is first shown in FIG. 3.

DETAILED DESCRIPTION

The following Detailed Description will first present some uses of dot plots in the analysis of large bodies of source code and text, will then show the graphical user interface employed with the dot plots in a preferred embodiment, will thereupon show how dot plots can be used to investigate any attributes of an ordered set of records, and will finally present a detailed discussion of the implementation of the preferred embodiment.

A Display Matrix showing a Dot Plot of a Body of Code: FIG. 1

FIG. 1 is a display matrix showing a dot plot 101 made using 3400 lines of C source code. The display shows a square similarity matrix with a dot 103 181 in position i, j just in case the $i^{th}$ line of the source code is the same as the $j^{th}$ input line. Of course, there would be a dot at every position where i=j, since every line of code is identical to itself. In this dot plot, the dots at those positions, which make up the main diagonal of the matrix, have been omitted. In the following discussion, the items which are compared to produce the dots in the dot plots are termed tokens. In FIG. 1, the tokens are lines of source code.

Note the very striking black line segments (for example 105), parallel to the main diagonal. These black line segments indicate duplicated subsequences of the code. One use of a dot plot is thus to find such duplicated subsequences. The source code which provided the input for FIG. 1 contains several duplicated sections: one section of 200 lines of code is repeated once, and another section of 100 lines is repeated three times.

Figure 2:
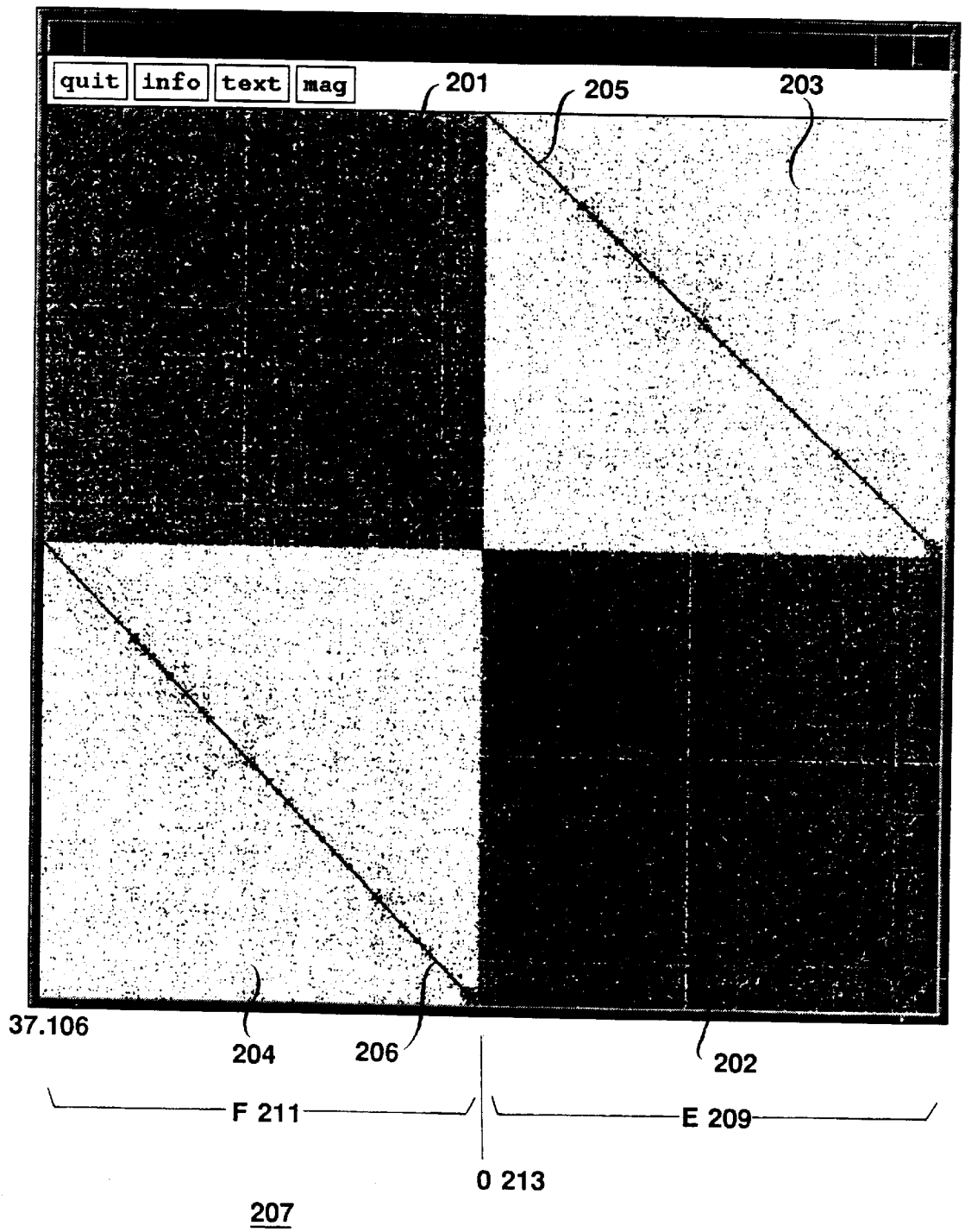
FIG. 2 is a display matrix of a dot plot showing similarities in a body of 37 million words of text.
Figure 3:
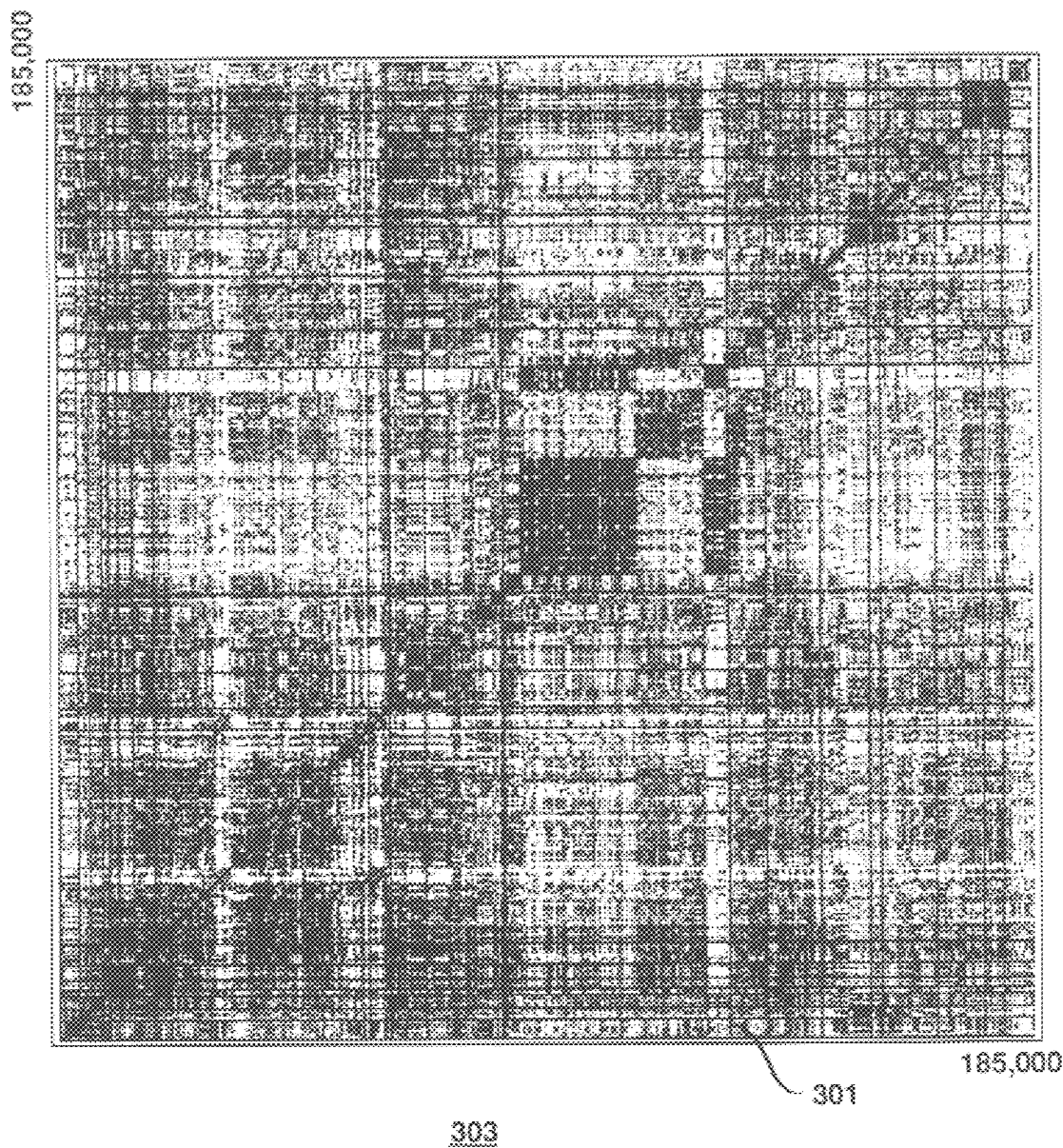
FIG. 3 is a display matrix of a dot plot showing similarities in a body of 185,000 lines source code for a computer program.

Dot Plots for Very Large Data Sets: FIGS. 2 and 3

FIG. 2 provides one example of how a dot plot may be used for a very large set of data. FIG. 2 is a dot plot for 37 million words of Canadian Parliamentary debates (Hansards) in English and French. Here, the tokens are the words of the text. The sequence of tokens used in the comparison is the sequence of words in the text.

The first half of the token sequence (E 209) denotes the English version of the debates, and the second half of the token sequence (F 211) denotes the French version. Note that the English text is more like the English text than like the French text, and the French text is more like the French text than like the English text, as evidenced by the fact that the upper left quarter (201) and lower right quarter (202) are more pronounced than the other two quarters (203 and 204).

Moreover, note the distinctive lines (205 and 206) running through the two off-diagonal quarters (203 and 204). Both of these lines are parallel to the main diagonal with an offset (O 213) of about 37/2 million words. The French translation of an English sentence will appear about 37/2 million words later in the sequence. This translation will contain an unusually large number of identical words because there are a fair number of words that are the same in the English and the French translation (e.g., proper nouns, numbers). Each of these words give rise to a dot. It is this sequence of dots that produces the characteristic line segments. Thus, to find an area of the French text which is a translation of a given part of the English text, one need only examine areas of the English and French texts which are represented by the elements of the dot plot along line 205.

FIG. 3 shows a display matrix 303 for a dot plot 301 of 185,000 lines of source code. The tokens in this dot plot are lines of source code. The grid lines 301 represent boundaries between the directories that contain the code. The reason for the large number of dots is that source code contains many blank lines and syntactic structures which are used identically in many places. The problem with such a dot plot is that the many dots make the significant similarities hard to see. This was already a problem with the applications of dot plots to DNA research, and Consequently, various filtering techniques were developed in these applications (see Maizel and Lenk, supra, and Pustell and Kafatos, "A high speed, high capacity homology matrix: zooming through SV40 and Polyoma," *Nucleic Acids Res.*, vol. 10, p. 4766), Of course the larger the size of the body of data, the more severe the problems. In addition to the filtering techniques disclosed in the DNA research literature, one can use traditional signal processing techniques that are commonly used to enhance pictures after they have been transmitted over noisy channels. In general, one wants to filter the dot plot in a way that emphasizes matches along the main diagonal and de-emphasize all other matches. Convolving the dot plot with an appropriately selected filter (e.g., a two-dimensional Gaussian kernal with a larger σ along the main diagonal) would accomplish this goal. Filtering techniques used in a preferred embodiment are discussed in detail below.

Figure 4:
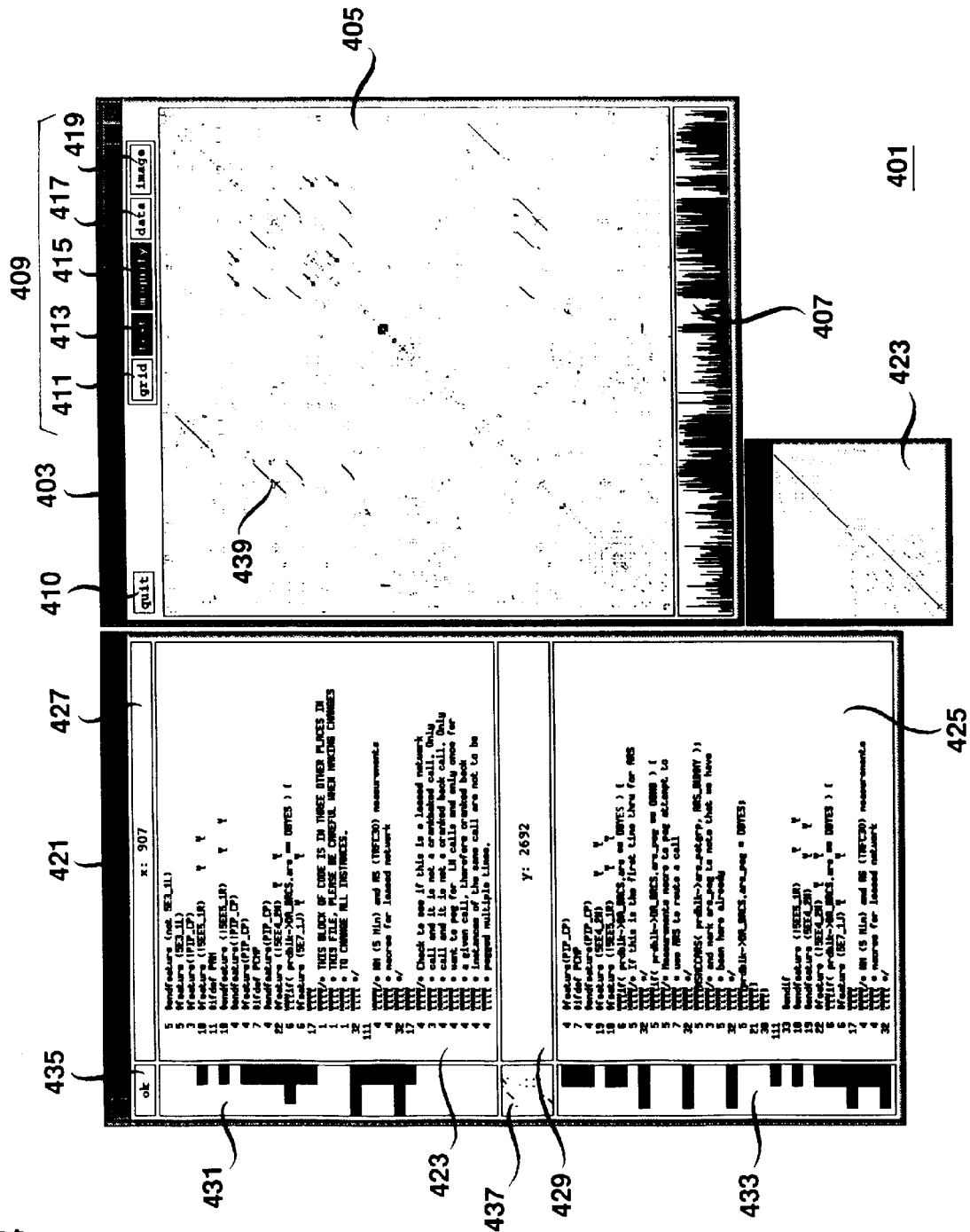
FIG. 4 shows a graphical user interface for a system which uses dot plots to show similarities.

Graphical User Interface employing Dot Plots: FIG. 4

The usefulness of dot plots increases when they are coupled with modern interactive graphic techniques. FIG. 4 shows the graphical user interface 401 employed in a preferred embodiment. The main window, 403, contains the dotplot image, 405, a histogram image of the dotplot, 407, and a set 409 of small selectable rectangular regions, or buttons, 410–419. Each column of the histogram image, 407, displays the sum of the dots in the corresponding column of the dotplot image, 405. Selecting the quit button, 410, exits the system. Selecting the grid button, 411, superimposes a grid over the dotplot image. The grid is used to denote natural boundaries in the input sequence, e.g., directories or files when dotplot 406 shows similarities in source code. Selecting the text button, 413, causes a new window to appear, 421, which provides a textual view of the input data (the details of the textual view will be described shortly). Selecting the magnify button, 415, causes a new window to appear, 423, which provides a magnified view of the of the dotplot around cursor 439. The magnified view uses no compression and thus has a single-pixel element corresponding to each element of the uncompressed dot Selecting the data button, 417, causes a menu to appear that allows various weighting techniques to be specified. Selecting the image button, 419, causes a menu to menu to appear that allows various color mapping techniques to be specified.

Both the magnified view, 423, and the textual view, 421, update whenever cursor 439 is positioned inside the dotplot image, B, and the user gives an indication, for example by pressing a mouse button, that magnified view 423 and textual view 421 are to be centered on the token pair corresponding to the (x,y) position of cursor 439. The textual view, 421, contains two subwindows, 423 and 425, that display textual input tokens, in this case, lines of code. To the left of each displayed input token is an integer which indicates the frequency with which the token appears in the body of tokens. The top text subwindow, 423, corresponds to the horizontal or x position of cursor 439, while the lower text subwindow, 425, corresponds to the vertical or y position of cursor 439. The interactive scrolling links the different views together by allowing regions of interest in the dotplot image to be examined both in greater detail and in terms of the original input tokens.

Other regions within the textual view, 421, also update interactively. The token numbers corresponding to x and y cursor coordinates are displayed in regions 427 and 429 (respectively). An additional magnified view, 437, is provided to indicate just the subregion of the dotplot that is shown in the textual subwindows M and N. Histograms, 431 and 433, are also provided on the left of the textual subwindows. Each bar of the histogram image, 431, displays the sum of the dots in the corresponding column of the magnified view, 437 (from left to right). Each bar of the histogram image, 433, displays the sum of the dots in the corresponding row of the magnified view, 437 (from bottom to top). Selecting the ok button, 435, deletes the textview window, 421.

Figure 5:
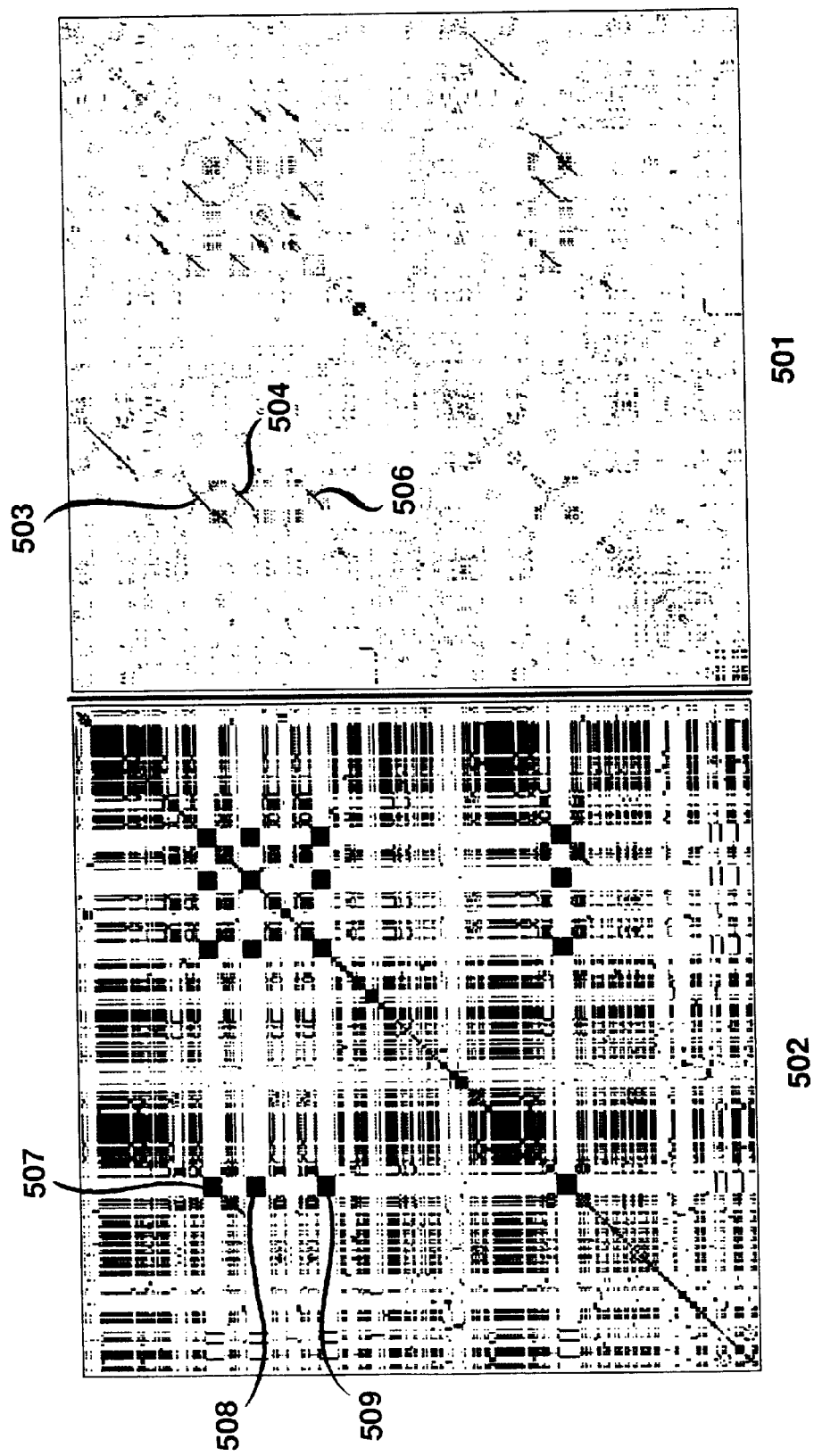
FIG. 5 shows the use of a display matrix of a dot plot to show which parts of a body of data have the same author.

Using Dotplots Generally to Show Matching Attributes: FIG. 5

In the examples given heretofore, dotplots have been used with words of text and lines of code. The technique may, however, be used to compare the values of any attribute of a sequence of records. For example, data bases are often used to keep track of changes in large bodies of code. Associated with each line of code is a record which typically includes as attributes the text of the line of code, the author of the line of code, the date the line of code was added or removed, and an identification of the change order which resulted in the addition or removal of the line.

FIG. 5 shows how a dotplot can be used with such a data base to study the relationship between lines of code and authors. FIG. 5 shows two views of the same input sequence. The right panel (501) is similar to FIG. 1 above and shows duplicate lines of source code. The left panel (502) is new. In this case, a dot is used to indicate that the author of $i^{th}$ line is the same as the author of the $j^{th}$ line. Note that many of the duplicated sections show up as distinctive line segments (e.g., 503, 504, 506) in the right panel (501), and as squares (e.g., 507, 508, 509) in the left panel (502). This combination of patterns is to be expected, since it is fairly common to find that a duplicated section was all written by the same author.

The important point to note in FIG. 5 is that dots need not be used only to indicate strict equality, but can also be used whenever an attribute of a set of records is to be investigated for equivalent values.

Moreover, one need not require that the values of the attributes match exactly, but only that they be in some sense similar. For example, one might want to relax the match criterion on time so that two lines of code written might be considered similar if they were written on the same day or the same week. In the same fashion, one might want to allow for matches between similar author names. Authors sometimes use their middle initial, and sometimes don't. Again, one might define different degrees of similarity in order for two lines of code to match. We may wish to say that two lines of code match even if they differ in the white space or that two lines of code match even if they differ in the names of the variables (parameters). This last case is particularly interesting when the apparatus is being used to look for duplicated sections of code that should be replaced with a single subroutine.

Finding Long Matching Patterns: FIG. 6

Heretofore, matching has been discussed with regard to individual tokens. However, it is often the case that what the user is really interested in is matches of sequences of tokens, particularly when the sequences exceed a certain length. In a preferred embodiment, it has been found to be useful to superimpose matches of sequences of tokens upon a dotplot of token matches.

A sequence of tokens can be considered to be a pattern. Efficient techniques have been available for more than 15 years to find or relate patterns in a sequence or string of symbols. Examples of applications are bibliographic search and the UNIX(TM) diff command, which compares two files of text or code by determining the minimum number of insertions or deletions required to transform one file into the other file.

One method of processing a file so that searches may be made efficiently for a pattern such as a word is to build a known data structure called a suffix tree that encodes an entire file. For any pattern to be searched for, the pattern can be processed one token at a time, and all the possible occurrences of the pattern in the file are simultaneously compared via the suffix tree to the pattern, and discarded token by token as mismatches occur, until the pattern is completely processed, and the resulting good matches can be read off from the suffix tree. The remarkable property of the suffix tree is that it can be built in time and space linear in the size of the input file, as long as the number of types of tokens is fixed, and the search for the pattern also can be performed in linear time and space.

In the preferred embodiment, a program called dup is used to search for all pairs of matching patterns in the input whose length exceeds a parameter set by the user. The program allows for two possible definitions of "matching". The first definition is that two patterns match if they are identical sequences of tokens. This is called an exact match. The second definition allows for each token to be accompanied by a list of symbols; in this case, two sequences match if a one-to-one correspondence can be found between the sets of symbols for the two sequences, such that the first sequence is transformed into the second sequence by replacing the first set of symbols by the second set of symbols. The latter kind of match is called a parameterized match. As suggested above, parameterized matching is particularly useful when looking for duplicated sections of code that should be replaced with a single subroutine.

FIG. 6 shows an example of a parameterized match 601. The source code on the left (603) is the same as the code on the right (605), except for the names of three variables:

| | |
|---|---|
| pfh→pfi | 1. |
| lbearing→left | 2. |
| rbearing→ | 3. |

It is useful to identify parameterized matches because they can often be rewritten as subroutines. Moreover, it is widely believed that replacing the duplicated code with subroutines will often produce code that is easier to support, and takes fewer computational resources to execute.

Dup reports the longest such match. In general, whenever two sequences match, either exactly or parametrically, then one would expect to find that many of the subsequences also match. But these shorter matches are deemed to be less interesting, and therefore dup removes these shorter matches and reports only the longest ones. In particular, a longest match has the property that it cannot be extended in either direction. That is, both sequences must be delimited on both sides with tokens that do not match.

When these longest matches are superimposed on top of a dot plot, the user is able in order to distinguish sequences with an unusually large number of matches (e.g., line 205 in FIG. 2) from sequences consisting entirely of matches such as those shown in FIG. 6. While dup is related to pattern-matching, and in fact uses the suffix tree data structure, the problem of reporting longest matches is fundamentally different from searching for patterns in text and the UNIX diff program. In the former case, a specific pattern is to be found, while in the latter case, the matching parts are paired sequentially through the file. The important difference for the longest matches is the notion of reporting all pairs of longest matches. dup will be explained in greater detail below.

Implementation of a Preferred Embodiment: FIGS. 7–15

In the following, an implementation of a preferred embodiment will be disclosed in detail. In overview, preferred embodiment 710 has the components shown in FIG. 7. The body of data which is to be investigated for similarities is input to apparatus 710 as input data 701; for example, if apparatus 710 is being used to look for duplicate lines of code, input data 701 is source code. Token maker 702 converts the input data into tokens representing the components of input data 701 for which matches are to be sought; in the case of source code, token maker 702 converts lines of code into a corresponding sequence of tokens 703. The sequence of tokens 703 goes to floating point image maker (FIM) 704, which makes a floating point representation (floating point image FI 705) of a dotplot for the sequence of tokens 703. As will be described in more detail below, floating point image maker 704 may perform a number of weighting, filtering, and compression operations. Floating point image 705 then goes to quantized image maker (QIM) 706, which transforms image 705 into quantized image (QI) 707. Quantized image 707 has a form which is advantageous for display on color display apparatus or display apparatus which employs a gray scale. Quantized image 707, finally, goes to interactive plot (IP) 709, which displays quantized image 707 as a dotplot on an interactive display device.

Preferred embodiment 710 is implemented by means of a C program which uses standard X libraries. The program can be executed on most Unix™ systems, such as a Sun system 4/360. The plotting graphics are configured to take advantage of the color hardware, if the computer is equipped with that option.

Input Data 701
The form and content of input data 701 depends on the application:

| Application | Input Data |
|---|---|
| Biology | DNA Sequence |
| Browsing Software | Collection of Source Files |
| Browsing Text | Collection of Documents |

Token Maker 702
Token maker 702 obtains a sequence 703 of N elements or tokens from the input data. Again the details of token maker 702 depend on the particular application.

| Application | Token |
|---|---|
| Biology | Base Pair |
| Browsing Software | Line of Code |
| Browsing Text | Word |

It is important to distinguish types and tokens. The English phrase, "to be or not to be," contains 6 words, but only 4 of them are distinct. We will say that the sentence contains 6 tokens and 4 types. By convention, we denote the number of tokens in the input data with the variable N, and we denote the number of types in the input data with the variable V (for "vocabulary size").

One might normally choose to represent types as strings. That is, it would be natural to represent the word to as the string "to", and the line of code $$\text{for}(i=1; i<N; i++)$$

as the string "for(i=1; i<N; i++)". For computational convenience, we have decided not to represent types as strings, but rather as contiguous integers in the range of 0–V. The strings are converted to numbers using a function called intern. The intern function inputs the strings one at a time and looks them up in a symbol table using standard hashing techniques. The symbol table associates each distinct string with its type number, a unique integer in the range of 0–V. If the string is already in the table then intern simply looks up the type number for that string in the symbol table and returns it. If the string is not already in the symbol table, then intern associates the string with the next unused type number, and inserts the string along with its new type number into the symbol table. Finally, the new type number is returned.

Representing tokens as integers has several advantages. In particular, it makes it easy to test whether two tokens share the same type or not:

```
/* is the i-th token the same as the j-th? */ tokens[i]
==tokens[j]
```

In order to make it possible to recover the string representation, we keep a V-long array of strings, which we call the wordlist. The $i^{th}$ element of the wordlist array contains the string representation of the $i^{th}$ token.
Floating Point Image Maker 704: FIG. 8
Floating point image maker 704 converts sequence of tokens 703 into a floating point image (fimage). In the simplest case, this is accomplished by placing a dot in fimage [i] [j] if the $i^{th}$ token is the same as the $j^{th}$ token, as shown in the pseudo code 801 of FIG. 8. In code 801, floating point image 705 is represented as an N×N array 803 of floating point numbers. As mentioned above, it is also possible to generalize the equality test to an arbitrary equivalence relation.

In practice, we have found it useful to enhance this simple algorithm in a number of ways:

1. Weighting: weight the points to adjust for the fact that some matches are less surprising (interesting) than others.
2. Compression: if N is large, it becomes impractical to allocate $N^2$ storage, and therefore it becomes necessary to compress the image in some way.
3. Estimation: if N is large, the time to compare all $N^2$ pair of tokens also becomes impractical, and therefore it becomes necessary to introduce certain approximations.
4. Filtering: if there are too many dots in the resulting fimage, it may be necessary to introduce some filtering in order to enhance the signal to noise ratio.

Weighting: FIGS. 9 and 10

Let us begin with the weighting step. A very simple scheme is to replace the 1 in FIG. 8 with weight (tokens[i]), where weight returns a value between 0 and 1, depending on how surprising it is to find that token [i] is the same as token [j]. Pseudocode 901 for this operation is shown in FIG. 9.

There are quite a number of reasonable functions to use for weight (tokens[i]). Pseudocode 1001 of FIG. 10 FIG. 10 illustrates the weighting concept, using the natural suggestion of weighting each match inversely by the frequency of the type. In this way, frequent types (e.g., the English word the or the line of C-code break; ) do not contribute very much to the fimage. The literature on Information Retrieval contains a considerable literature on weighting, which is known as term weighting or indexing, see Salton, G. (1989) *Automatic Text Processing*, Addison-Wesley Publishing Co. In a preferred embodiment, pushing data button 417 in graphical user interface 401 permits a user of graphical user interface 401 to specify various weighting techniques and their parameters. Guidance for the parameters is provided by histogram 407.

Compression: FIG. 11

If N is large, it becomes impractical to allocate $N^2$ storage, and therefore it becomes necessary to compress the image in some way. Suppose that we wanted to compress the fimage from N by N, down to n by n, for some $n \leq N$. Then we could simply aggregate values that fall into the same n by n cell as illustrated by pseudocode 1101 of FIG. 11. In practice, the signal should be filtered appropriately before compression in order to avoid aliasing. This type of filtering is well-known to those skilled in the art of signal processing.

Making an Approximate Floating Point Image 705

In practice, if N is very large, it becomes impractical to perform the $N^2$ comparisons as required by the algorithm in FIG. 11. It is therefore useful to introduce an approximation. We will assume that extremely frequent tokens will have vanishingly small weights, which can be approximated as zero. And consequently, it becomes unnecessary to compute their weights, producing a significant savings in time.

Before introducing pseudocode 1301 for the approximation in FIG. 13, it is convenient to introduce the notion of a posting. The posting is a precomputed data structure that indicates where a particular type can be found in the input sequence. Thus, for the input sequence, "to be or not to be," there are two postings for the type "to": one at position 0 and the other at position 4. One can compute the dots for the type "to" in this example by placing a dot in positions: (0, 0), (0, 4), (4, 0), and (4, 4). In general, for a word with frequency f, there are $f^2$ combinations of postings that need to be considered. FIG. 12 shows pseudocode 1201 for an algorithm for considering all $f^2$ combinations for each of the V types in the vocabulary.

We now come to the key approximation, shown in pseudocode 1301 of FIG. 13. If we assume that types with large frequencies ($f \geq T$, for some threshold T) have negligible weights, then we simply don't iterate over their postings. This approximation produces significant savings since it allows us to ignore just those types with large numbers of postings. In fact, the resulting computation takes less than V $T^2$ iterations. In practice, we have found that T can often be set quite small. FIG. 2, for example, was computed with T=20, so that the entire calculation took less than $400V \approx 52,000,000$ steps. If we had tried to use the $N^2$ algorithm, the calculation would have required $37,000,000^2$ steps, which is utterly impractical for an interactive system.

Figures 15, 16:
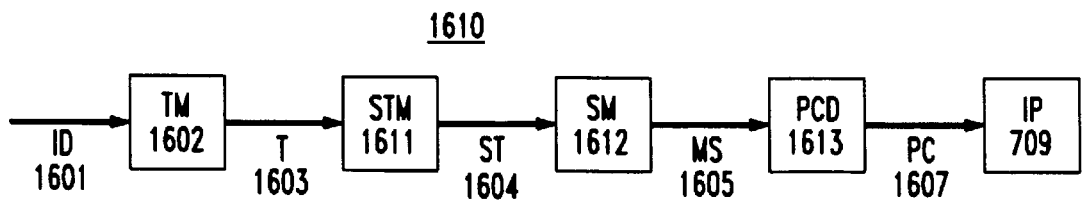
FIG. 15 is another algorithm for quantizing the values of elements of the floating point representation.
FIG. 16 is an overview of apparatus for finding duplicate sequences of tokens.

Quantized Image Maker 706: FIGS. 14 and 15

We ultimately want to display the fimage on a color monitor with a small number of colors, $C \approx 256$. At this point, the range of values in the elements of fimage is generally much larger than 256. It is therefore necessary to quantize the values in the fimage to match the dynamic range of the display device. Let us suppose we have a function quantize that takes a floating point value from the fimage as input, and produces a byte as output. Pseudocode 1401 for the function appears in FIG. 14.

The key question is how to implement quantize. The most obvious technique is to use linear interpolation: (We assume that fmin and fmax are the minimum and maximum values in the fimage, respectively).

```
char
quantize(x)
   float x;
{
   return((x - fmin)/(fmax -fmin));
}
```

Unfortunately, we have found that the values in the fimage often belong to an extremely skewed distribution and therefore the linear interpolation often introduces significant quantization errors. We have had much more success with a non- parametric approach using quantiles. That is, assign all of the $n^2$ values in the fimage to C quantiles. As shown in pseudocode 1501 of FIG. 15, this is done by copying fimage 705 into a linear array copy of as many elements as there are in fimage 705, sorting the elements of copy by their values, making an array breaks which has one element for each of the C values, dividing copy into C pieces, each of which has an equal number of elements, and assigning the value of the element at the beginning of a given one of the pieces to the corresponding element of breaks . Then the quantize function does the quantizing by taking a value x from an element of floating point image 705, searching through breaks until it finds an element such that the value in the element is less than or equal to x while the value in the next element is greater than x.

We have also found in practice that it helps to remove duplicate values in fimage 705 before computing the quantiles. In addition, there are a number of straightforward ways to speed up the calculation. In particular, the linear search in the quantize function above should be replaced with a sublinear search such as a binary search. More interestingly, Chambers, J., "Partial Sorting," CACM 1971, pp. 357–358, describes a partial sort algorithm which is much more efficient for computing quantiles than the complete sort used above.

Detailed Description of the DUP Program: FIGS. 16–20 dup program output is displayed on top of the dot plots. However, the dup program was implemented separately. The basic design of the dup program is presented in FIG. 16. The input data (1601) undergoes tokenization or lexical analysis in token maker (TM) 1602, which transforms the input data into a sequence of tokens (T) 1603, with or without parameters, as specified by the user.

Next, the components of blocks 1611 and 1612 perform a sequence matching process which finds all longest matches in the input (1605) that are at least as long as a minimum specified by the user. This is followed by parameter analysis, performed in block 1613, which processes the list of parameters (if any) for each token to determine if an appropriate one-to-one correspondence can be made. There may be 0 or more parameterized matches found for each exact match that is examined. Finally, the sequences are superimposed over the dot plot in interactive plot block 709

Token Maker 1602

Input data 1601 is processed to obtain a sequence of tokens 1603, with or without a list of parameters for each token, as requested by the user in the command line which is used to invoke dup. As in FIG. 7, the token sequence could represent lines of code or words in text or base pairs in biology. In addition, each token may have associated with it a list of symbol names to be considered for parameterization.

In dup, parameterization is applied to code, and the symbol names can be variable names, constants, function names, structure member names, or macro names. In preparation for parameterization, each symbol name in the code is replaced by "P" and the comments and white space are deleted. The reason for replacing each symbol name by "P" is that the token type of the transformed line will encode the number and positions of the replaced symbols, but not their names. Thus, the exact matching step will match tokens representing lines with the same numbers and positions of symbols. The parameterization step will then determine whether a one-to-one correspondence can be made between the symbol names. After each line is transformed as just described, the line is tokenized as previously described. Techniques for performing such lexical analysis are well-known to those skilled in the art. See for example A. V. Aho, Ravi Sethi, and J. D. Ullman, Compilers: *Principles, Techniques, and Tools*, Addison-Wesley, Reading, Mass., 1986.

As before, the variable N will be used to denote the number of tokens in the input data, and the variable V will be used to denote the number of types (size of the vocabulary). In addition, the variable S will be used to denote the number of symbol names (parameters). Each token is represented as an integer in the range 1- V, and each symbol name is represented as an integer in the range 1-S. An array inids is created to store the sequence of token numbers. An intermediate file is created containing the list of symbol numbers for each token, to be used in the parameter analysis phase. A symbol table is created to store the actual names of the symbols.

Suffix Tree Maker 1611

The matching phase begins by constructing a suffix tree using William Chang's implementation of McCreight's algorithm. The algorithm is explained in Edward M. McCreight, "A Space-Economical Suffix Tree Construction Algorithm", *Journal of the Association for Computing Machinery* 23,2 (1976), pp. 262–272. Suffix trees are a well-known data structure in the string matching literature, though they have not been used previously for this particular matching problem: the problem of finding all longest matches.

Figure 17:
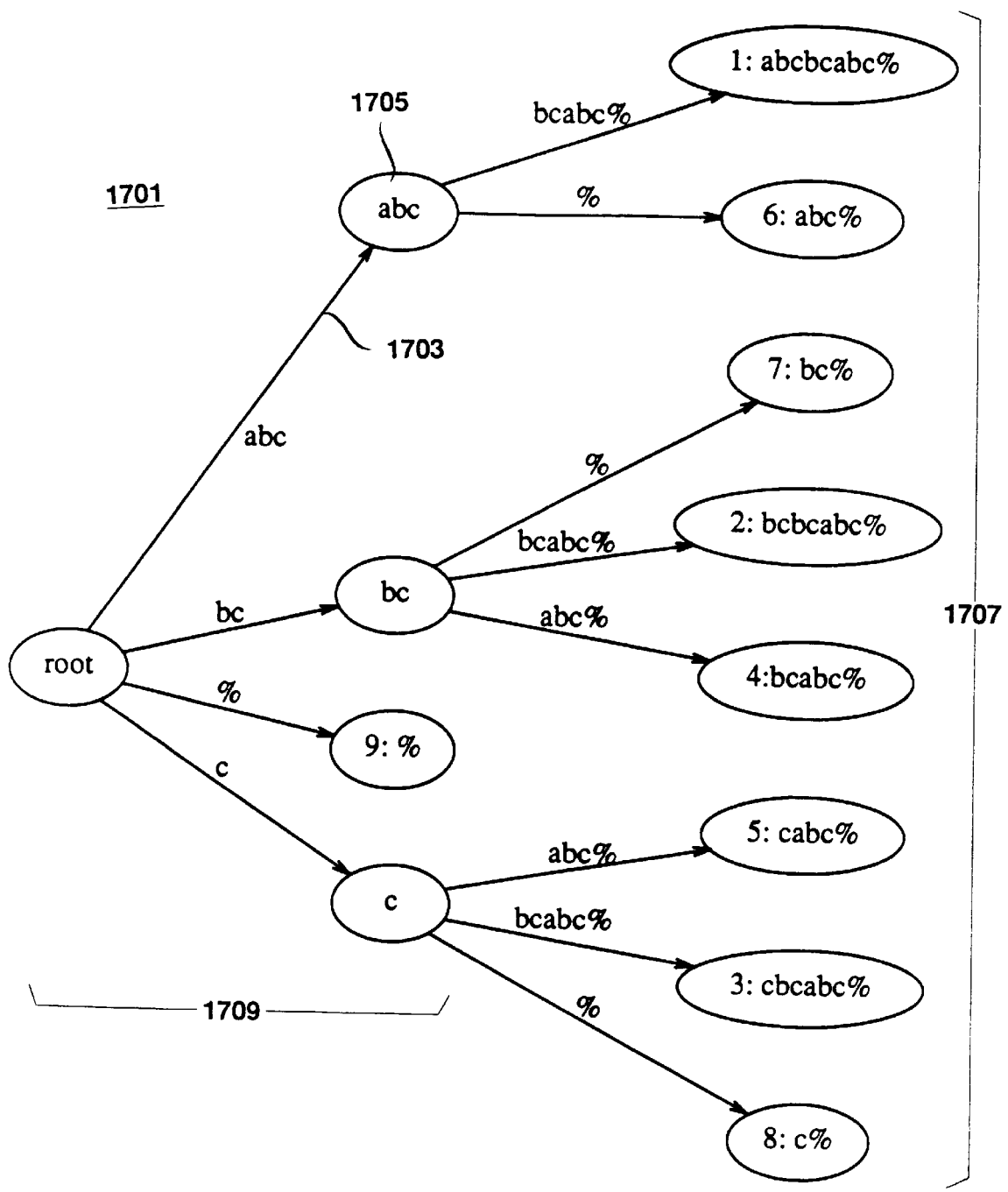
FIG. 17 is a suffix tree employed in the apparatus of FIG. 16.

An example of a suffix tree 1701 is shown in FIG. 17, for the input sequence of tokens: abcbcabc %. It is convenient when discussing suffix trees to think of the input sequence as a string, and to refer to each token of the input sequence as a letter. By the same analogy, a suffix is simply a subsequence of the input string, beginning at some position p, and continuing on to the end, position N. We will assume that the $N^{th}$ token is unique; this can be accomplished by modifying the tokenizer to add an extra token to the end of the input stream, if necessary.

Each edge 1703 of the suffix tree represents a substring of the input string. For explanatory convenience, assume that each node 1705 is labeled with the substring formed by concatenating the substrings along the path from the root to the node in question. In practice, the nodes need not be labeled with these strings since they can be computed if necessary. In general, a node n might correspond to several positions in the input string. For example, the node labeled abc in FIG. 17 might correspond to either position 1 or position 6 in the input string. However, the leaf nodes 1707 are a particularly interesting special case because they are known to be associated with unique positions in the input string since they always end with the $N^{th}$ input token % with is guaranteed to be unique by construction. Therefore, a leaf node, b, is labeled with a position p. Internal (non-leaf) nodes 1709 cannot be so labeled, because they do not necessarily correspond to a single unique position p, but may correspond to several positions. We will use the function position to retrieve the position of a leaf node.

A key property of suffix trees is that for two distinct suffixes, say bcabc % and bc %, the paths from the root to the leaves for the suffixes are the same until the point at which their tokens are different, in this case the third token, which is a in the former suffix and % in the latter suffix. Thus, the divergence in the suffixes is reflected in the divergence of the corresponding paths in the suffix tree. Another key property is that the tree can be stored in linear space: while the token sequence for an edge is useful conceptually, it is sufficient to store for each edge a position in the input string and a length.

The function prec(b) will be used to retrieve the token before the substring corresponding to the leaf node b. It can be implemented as:

```
int
prec(b)
    node *b;
{
    return(inids[position(b)-1]);
}
```

Another useful function is: length(n). It is defined to return the length of the substring corresponding to node n, which can be computed recursively from the suffix tree.

It is well-known how to use suffix trees to find matches. Suppose for example, that a node n has two or more sons, $s_1$ and $s_2$, and after a number of generations, we reach two leaves, $b_1$ and $b_2$, which are the descendants of $s_1$ and $s_2$, respectively. Then, we know that the substring ending as position position($b_1$) with length(n) must be the same as the substring ending at position position($b_1$) with length(n).

However, these two substrings will not necessarily represent a longest match, because there might be a longer one. In particular, if the character to the left of the first string is the same as the character to the left of the second string then there is a longer match of at least n+1 tokens. This example illustrates that, for the problem of interest here, namely finding longest matches, we need to process the suffix tree by an additional novel step which filters out matches that are not as long as they could be.

Find Longest Matches: FIG. 18

Conceptually, we would like to check each pair of matches proposed by the previous algorithm and throw out those matches which can be extended by one letter to the left. Consider the example described above where the node n has two sons, $s_1$ and $s_2$. We will build a data structure called a clist for each of these sons. A clist is a list of pairs of the form:

<left context><set of positions>

The set of positions (or plist) indicate points in the input string where there might be matches. The left context is the character C just to the left of the candidate matches. When we believe that we might have a match, using an algorithm like the one described above, we first check the two clists to see if the left contexts are the same or not. If they are different, then we know that we have a longest match, and it is reported.

In any case, we construct a combined clist to be used for the remaining sons of n, if any. This combined clist is formed by taking the union of the left contexts, and associating each of them with the appropriate combined plist.

FIG. 18 outlines this algorithm in further detail. Procedure process 1801 recurses depth-first through the suffix tree, starting with the root. The recursion bottoms out when it reaches a leaf node b. In which case, the procedure returns a clist consisting of one character (the left context, prec(b)) and one position (position(b)). For internal nodes, the process procedure creates clists recursively for each of the sons, and then combines them using the function combine. The combine function reports matches that meet two conditions: (a) they must be longest matches (distinct left contexts), and (b) they must be longer than a user-specified threshold, minprint.

In addition, the combine function returns a combined clist to be used for the remaining sons, if any. This combined clist takes the union of the left contexts, and associates each left context with the union of the positions that it has been found with so far.

Parameter Analysis: FIGS. 19–22

This phase is needed only for parameterized matches. The problem is to show how the variables in one sequence can be rewritten to match those in the other sequence. If they can be done, then it should be possible to replace both sequences with a single subroutine.

Unfortunately, it is not always possible to find the mapping since there can be irreconcilable conflicts 1901, as illustrated in FIG. 19.

If there is a conflict at the $i^{th}$ position in the match, then dup resolves the conflict by
1. reporting a match up the the i-$1^{st}$ line,
2. removing the conflicting rewrite rules,
3. and restarting the parameter analysis just after the line with the conflicting parameter use.

Following up on the example in FIG. 19, FIG. 20 shows that there is a parameter conflict on the second line of the sequence. The algorithm then reports a match of just one line 1-1. (In practice, of course, matches less than minprint are not reported.) The parameter analysis is restarted on line 2, the line just after the conflicting parameter use. A second conflict is introduced on line 5, and therefore a second match is reported for lines 2–4. Finally, a third match is reported for the last line.

$$y \rightarrow b; z \rightarrow c; h \rightarrow h; x \rightarrow x$$

The parameter analysis begins by reading in a file containing symbol numbers for each token. The total number of symbol numbers over all tokens will be denoted by T. All T symbol numbers are stored in an array allsym, and an array begsym is set up such that begsym[j] is the entry in allsym containing the first parameter number for token j, and begsym[N+1]=T. From begsym and allsym it is easy to compute how many symbols there are for each token and what the symbol numbers are. Macro id[i,j] is defined as in FIG. 21; it accesses the jth symbol in the ith token.

The parameter analysis is performed by the algorithm shown in FIGS. 21 and 22. An integer array par[2,S] is used to maintain the one-to-one correspondence between the symbols that will be developed during processing; par[0,j] and par[1,j] will be the parameter numbers assigned to the jth symbol in the two token sequences being compared, or NOTSET (defined to be −1) if no parameter number has yet been assigned.

Each exact match of same tokens beginning at tokens s0 and s1 will be processed as follows. Let maxpar be the number of symbols in each set of tokens; the number is the same since the transformed lines match exactly. An integer array sym[2,maxpar] is allocated; sym[0,j] and sym[1,j] will be the symbol numbers assigned to the jth parameter in the two token sequences being compared. An integer array lastuse[maxpar] is allocated; lastuse[j] will be the last token number in which the jth parameter was used.

Then, for each exact match of same tokens beginning at tokens s0 and s1, findproc(s0, s1, same) is called (FIG. 21). findproc processes the tokens one by one, pairing up corresponding symbols, and checking for conflicts with previous pairings. When a conflict is found, the current match is terminated and checked for reportability; then the tables are adjusted for beginning a new symbol pairing and a new match. If no conflicts are found, the match is checked for reportability. A match is reportable if it has at least minprint tokens and the number of parameters is at most half the number of tokens.

Conclusion

The foregoing Detailed Description has disclosed to one of ordinary skill in the art how similar items may be detected in large bodies of data such as text, source code, and records with attributes and how dotplots may be used to show relationships between such similar items and the body of data as a whole. It has further disclosed how such dotplots may be implemented so that they may be employed in interactive tools and has disclosed a graphical user interface for such a tool which permits the user not only to study the dot plot, but also to study the underlying data. The Detailed Description has further disclosed a technique for finding matching sequences of tokens which are greater than a user-specified length and has disclosed how the technique may be employed with parameterized tokens.

As will be apparent to those of ordinary skill in the art, many alternatives to the preferred embodiment disclosed herein are possible. Algorithms other than those disclosed herein may be used to implement the disclosed apparatus and methods, and the apparatus and methods may be employed with graphical user interfaces which differ from the ones disclosed herein. That being the case, the Detailed Description is to be understood as being in all respects illustrative and exemplary, but not restrictive, and the scope of the invention disclosed herein is to be determined solely from the claims as interpreted in light of the doctrine of equivalents.

What is claimed is:

1. Apparatus for displaying similarities between lines of text in a sequence of n lines of text, the apparatus comprising:

means for representing a n×n matrix wherein there is a first mark in element (i,j) of the matrix if a comparison of line (i) with line (j) indicates that line (i) and line (j) have similar values;

means for mapping the n×n matrix onto a display matrix, the mapping being done such that second marks indicating significant first marks are displayed in the display matrix;

pointing means for selecting a point in the display matrix;

first attribute display means for responding when the pointing means designates a point in the display matrix onto which the element for line (i) and line (j) is mapped by displaying a set of lines including line (i); and second attribute display means for responding when the pointing means designates the point by displaying a set of lines including line (j).

2. Apparatus for displaying similarities between lines of text in a sequence of n lines of text, the apparatus comprising:

means for representing a n×n matrix wherein there is a first mark in element (i,j) of the matrix if a comparison of line (i) with line (j) indicates that line (i) and line (j) have similar values; and means for mapping the n×n matrix onto a display matrix, the mapping being done such that second marks indicating significant first marks are displayed in the display matrix, wherein the means for representing the n×n matrix includes means for modifying the data to produce tokens which are more easily comparable than the tokens of the data; and the comparison is done using the more easily comparable tokens.

3. Apparatus for displaying values of an attribute of records in a sequence of n records, the apparatus comprising matrix display means (405) which displays a representation of an n×n matrix wherein each element (i,j) of the matrix represents record (i) and record (j) and pointing means (439) for selecting one element in the representation; and the apparatus being characterized by attribute display means (423,425) for responding when the pointing means designates the element for the record (i) and the record (j) by displaying the values of the attribute for a first set of records including the record (i) and a second set of records including the record (j).

4. Apparatus for displaying similarities between sequences of tokens on a display device comprising:

means (702) for producing the tokens in the sequences from data; and means (704) for receiving the tokens and making a dotplot (405) representing a comparison of each of the tokens in one of the sequences with all of the tokens in another of the sequences and providing the dotplot to the display device, the apparatus being characterized in that:

the means for making the dotplot is able to make a dotplot wherein each sequence of tokens being compared contains at least n tokens, where n >>10,000; and the means for making the dotplot makes the dotplot of a size such that the dotplot fits in its entirety on the display device; and the means for obtaining the tokens includes means (1602) for modifying the data to produce tokens which are more easily comparable than tokens produced from the unmodified data.

5. The apparatus set forth in claim 4 further characterized in that:

the means for modifying the data replaces portions of the data with a symbol representing a parameter.

6. The apparatus set forth in claim 5 further characterized in that:

the means for making the dotplot includes means (901) for weighting the significance of each comparison and representing only the results of more significant comparisons in the dotplot.

7. The apparatus set forth in claim 6 further characterized in that:

each token has a type;

the apparatus includes means (1001) for determining the frequency with which tokens of each type occur in the data;

the dotplot indicates comparisons in which one token equals another token; and the means for weighting the significance of each comparison is means (1001) for weighting the significance inversely to the frequency of tokens having the type of the tokens which equal each other.

8. The apparatus set forth in claim 5 further characterized by:

pointing means (439) for selecting a point in the dotplot representing the comparison of token (i) in one sequence with token (j) in another sequence; and means (401) for displaying a first portion (423) of the data which contains token (i) and a second portion (425) of the data which contains token (j) in addition to the dotplot.

9. The apparatus set forth in claim 5 further characterized in that:

the means for displaying further displays an uncompressed dot plot (424) of a first region around the selected point.

10. The apparatus set forth in claim 9 further characterized in that:

the means for displaying further displays an uncompressed dotplot (437) of a second region around the selected point which corresponds to the first and second portion.

11. The apparatus set forth in claim 8 further characterized in that:

the means for displaying further displays a first histogram (431) of the frequencies of tokens having the types of the tokens in the data shown in the first portion and a second histogram (433) of the frequencies of tokens having the types of the tokens in the data shown in the second portion.

12. The apparatus set forth in claim 4 further characterized in that:

the means for making the dotplot includes means (1301) for performing only more significant ones of the comparisons.

13. The apparatus set forth in claim 12 further characterized in that:

each token has a type;

the apparatus includes means (1001) for determining the frequency with which tokens of each type occur in the data; and the means for performing only more significant ones of the comparisons performs comparisons only of tokens belonging to types having frequencies smaller than a threshold.

14. The apparatus set forth in claim 4 further characterized in that:

the tokens are values of an attribute of records in a sequence thereof.

15. The apparatus set forth in claim 4 further characterized in that:

the tokens are words in a text.

* * * * *